(12) United States Patent

Grauberger

(10) Patent No.: US 12,568,892 B1
(45) Date of Patent: Mar. 10, 2026

(54) PLANT SUPPORT STRUCTURE FOR IMPROVING CANOPY LIGHT EXPOSURE

(71) Applicant: MJNN LLC, South San Francisco, CA (US)

(72) Inventor: Kevin Duane Grauberger, Laramie, WY (US)

(73) Assignee: MJNN LLC, South San Francisco, CA (US)

( * ) Notice: Subject to any disclaimer, the term of this patent is extended or adjusted under 35 U.S.C. 154(b) by 0 days.

(21) Appl. No.: 18/450,944

(22) Filed: Aug. 16, 2023

Related U.S. Application Data

(60) Provisional application No. 63/371,940, filed on Aug. 19, 2022.

(51) Int. Cl.
*A01G 9/02* (2018.01)
*A01G 31/04* (2006.01)

(52) U.S. Cl.
CPC ........... *A01G 9/022* (2013.01); *A01G 31/045* (2013.01)

(58) Field of Classification Search
CPC .... A01K 9/022; A01K 31/045; A01G 31/025; A01G 9/023; A01G 9/024; A01G 9/022; A01G 31/045
See application file for complete search history.

(56) References Cited

U.S. PATENT DOCUMENTS

| | | | |
|---|---|---|---|
| 8,627,598 B1 | 1/2014 | Souder et al. | |
| 11,089,741 B2 * | 8/2021 | Coffin | A01G 31/045 |
| 11,653,601 B2 * | 5/2023 | Choe | A01G 9/024 |
| | | | 47/65.5 |
| 2014/0000162 A1 | 1/2014 | Blank | |
| 2014/0366443 A1 | 12/2014 | Brusatore | |
| 2017/0146226 A1 | 5/2017 | Storey et al. | |
| 2018/0014485 A1 | 1/2018 | Whitcher et al. | |
| 2018/0014486 A1 | 1/2018 | Creechley et al. | |
| 2020/0236869 A1 * | 7/2020 | Johnson | A01G 31/045 |
| 2021/0315169 A1 | 10/2021 | Thomas et al. | |
| 2022/0217914 A1 * | 7/2022 | Olsson | A01G 9/023 |
| 2022/0227007 A1 | 7/2022 | Flynn et al. | |

FOREIGN PATENT DOCUMENTS

| | | |
|---|---|---|
| CN | 101647386 A | 2/2010 |
| CN | 103615128 B | 12/2015 |
| EP | 0610137 A1 | 8/1994 |

(Continued)

OTHER PUBLICATIONS

International Search Report and Written Opinion for PCT Application No. PCT/US2019/023201 mailed Oct. 4, 2019, 17 pages.

(Continued)

*Primary Examiner* — Kristen C Hayes
(74) *Attorney, Agent, or Firm* — Almanac IP Advisors LLP

(57) ABSTRACT

A plant support structure (e.g., a grow tower) comprises a spine and grow sites (e.g., pots) coupled to the spine. Each grow site may be configured to hold a root mass of a plant, such as a micro dwarf tomato. Each grow site may be disposed above another grow site. A ratio of a width of the spine to a width of the grow sites may be less than 1.0. A harvesting system may comprise multiple plant support structures, and a superstructure from which the structures are suspended and conveyed along a grow line to a harvesting site.

16 Claims, 6 Drawing Sheets

(56)     References Cited

FOREIGN PATENT DOCUMENTS

| | | | | |
|---|---|---|---|---|
| JP | H0614663 | A | 1/1994 | |
| WO | WO-2009025514 | A2 * | 2/2009 | .......... A01G 31/045 |
| WO | 2017205420 | A1 | 11/2017 | |
| WO | 2017217130 | A1 | 12/2017 | |
| WO | 2018037577 | A1 | 3/2018 | |
| WO | 2018175794 | A1 | 9/2018 | |
| WO | 2019183244 | A2 | 9/2019 | |
| WO | 2020092503 | A1 | 5/2020 | |
| WO | 2020092506 | A1 | 5/2020 | |
| WO | WO-2021055257 | A1 * | 3/2021 | .......... A01C 23/042 |

OTHER PUBLICATIONS

International Search Report and Written Opinion for PCT Application No. PCT/US2019/058764 mailed Apr. 3, 2020, 20 pages.
International Search Report and Written Opinion for PCT Application No. PCT/US2019/058770 mailed Jan. 13, 2020, 10 pages.

* cited by examiner

PLANT SUPPORT STRUCTURE FOR IMPROVING CANOPY LIGHT EXPOSURE

CROSS-REFERENCE TO RELATED APPLICATIONS

This application claims the benefit of priority to U.S. Provisional Application No. 63/371,940, filed Aug. 19, 2022, which is incorporated by reference in its entirety herein.

FIELD OF THE DISCLOSURE

The disclosure relates generally to the field of agriculture, and in particular to grow tower designs.

BACKGROUND

During the twentieth century, agriculture slowly began to evolve from a conservative industry to a fast-moving high-tech industry in order to keep up with world food shortages, climate change and societal changes. Farming began to move away from manually-implemented agriculture techniques toward computer-implemented technologies. In the past, and in many cases still today, farmers only had one growing season to produce the crops that would determine their revenue and food production for the entire year. However, this is changing. With indoor growing as an option and with better access to data processing technologies, among other advanced techniques, the science of agriculture has become more agile. It is adapting and learning as new data is collected and insights are generated.

Advancements in technology are making it feasible to control the effects of nature with the advent of "controlled indoor agriculture" or "controlled-environment agriculture." Improved efficiencies in space utilization, lighting, and a better understanding of hydroponics, aeroponics, crop cycles, and advancements in environmental control systems have allowed humans to better recreate environments conducive for agriculture crop growth with the goals of greater yields per square foot, better nutrition and lower cost.

US Patent Publication Nos. 2018/0014485 and 2018/0014486, both assigned to the assignee of the present disclosure and incorporated by reference in their entirety herein, describe environmentally controlled vertical farming systems. The vertical farming structure (e.g., a vertical column) may be moved about an automated conveyance system in an open or closed-loop fashion, exposed to precision-controlled lighting, airflow and humidity, with ideal nutritional support.

The towers can take different forms; in particular depending upon the size and shape of the individual plants. It is desired here to design a tower for optimal exposure of the canopy of tomatoes or other fruiting plants to light.

SUMMARY OF THE DISCLOSURE

Embodiments of the disclosure are directed to plant support structure (e.g., a grow tower) for controlled environment agriculture systems. According to embodiments of the disclosure, the plant support structure comprises a spine (of, e.g., a rigid or flexible structure), and a plurality of grow sites (e.g., pots) coupled to the spine. Each grow site may be configured to hold a root mass of a plant, such as a micro dwarf tomato. A harvesting system may comprise multiple plant support structures and a superstructure from which the structures are suspended and conveyed along a grow line to a harvesting site.

According to embodiments of the disclosure, each grow site in the plurality of grow sites is disposed above another grow site of the plurality of grow sites, and a ratio of a width of the spine to a width of the grow sites is less than 1.0, e.g., less than 0.25. The width of the spine may, for example, be in a range of 1-3 inches and the width of the grow sites in a range of 3-4 inches.

The spine may be disposed in a vertical position during a growth stage and in a horizontal position during a harvesting stage. Each grow site may be vertically oriented during the growth stage and during a harvesting stage.

Each grow site may be oriented at an angle between 30-90 degrees with respect to the vertical dimension during the growth stage. Each grow site may comprise a first irrigation line entering a top portion of the grow site and a second irrigation line exiting a bottom portion of the grow site.

The spine may comprise a hollow structure (e.g., a tube) that has an inlet for collecting fluid from an upper grow site of the plurality of grow sites and an outlet for providing fluid to a lower grow site of the plurality of grow sites. The inlet may be connected to the upper grow site and the outlet connected to the lower grow site.

The structure may comprise, for each of the plurality of grow sites, a funnel for directing fluid toward a top portion of the grow site.

Each grow site may be coupled by a coupling to the spine so that it is free to move in at least one dimension to maintain its orientation while a major axis of the spine moves toward a horizontal dimension during the harvesting stage. The coupling may comprise a swivel, cable, cord, or rope.

DETAILED DESCRIPTION

The present description is made with reference to the accompanying drawings, in which various example embodiments are shown. However, many different example embodiments may be used, and thus the description should not be construed as limited to the example embodiments set forth herein. Rather, these example embodiments are provided so that this disclosure will be thorough and complete. Various modifications to the exemplary embodiments will be readily apparent to those skilled in the art, and the generic principles defined herein may be applied to other embodiments and applications without departing from the spirit and scope of the disclosure. Thus, this disclosure is not intended to be limited to the disclosed embodiments, but is to be accorded the widest scope consistent with the claims and the principles and features disclosed herein.

According to embodiments of the disclosure, a controlled-environment agriculture system has a plurality of grow structures such as grow towers or pots attached to and conveyed by an automated conveyance mechanism. An irrigation system supplies aqueous nutrient solution to the tops of the grow structures. According to embodiments of the disclosure, gravity causes the solution to travel down an inner cavity of the structures to irrigate plants in grow sites located along the structures. A gutter may collect excess nutrient solution exiting the bottom of the structures. According to embodiments of the disclosure, the grow structures each include funnels attached at the top of the structures. Each funnel includes a collector configured to overlap with funnels of adjacent grow structures. This configuration de-couples irrigation from conveyance. In particular, this configuration allows for structures to be irrigated while also being conveyed by the automated conveyance mechanism. Embodiments of the disclosure can be implemented in a vertical farm production system that includes grow towers as described herein. However, the present invention is not limited to any particular grow structure. For example, the grow towers may include grow sites along a single face or multiple faces, such as the grow towers disclosed in U.S. Patent No. PCT/US19/058764, which is incorporated by reference herein. Furthermore, the grow structures may be horizontally-oriented grow structures. According to embodiments of the disclosure, the grow structures may be pots or other receptacles vertically arranged during a growth phase, or arrayed on or fixed to locations on a tray or grid, or in a trough.

Figure 1:
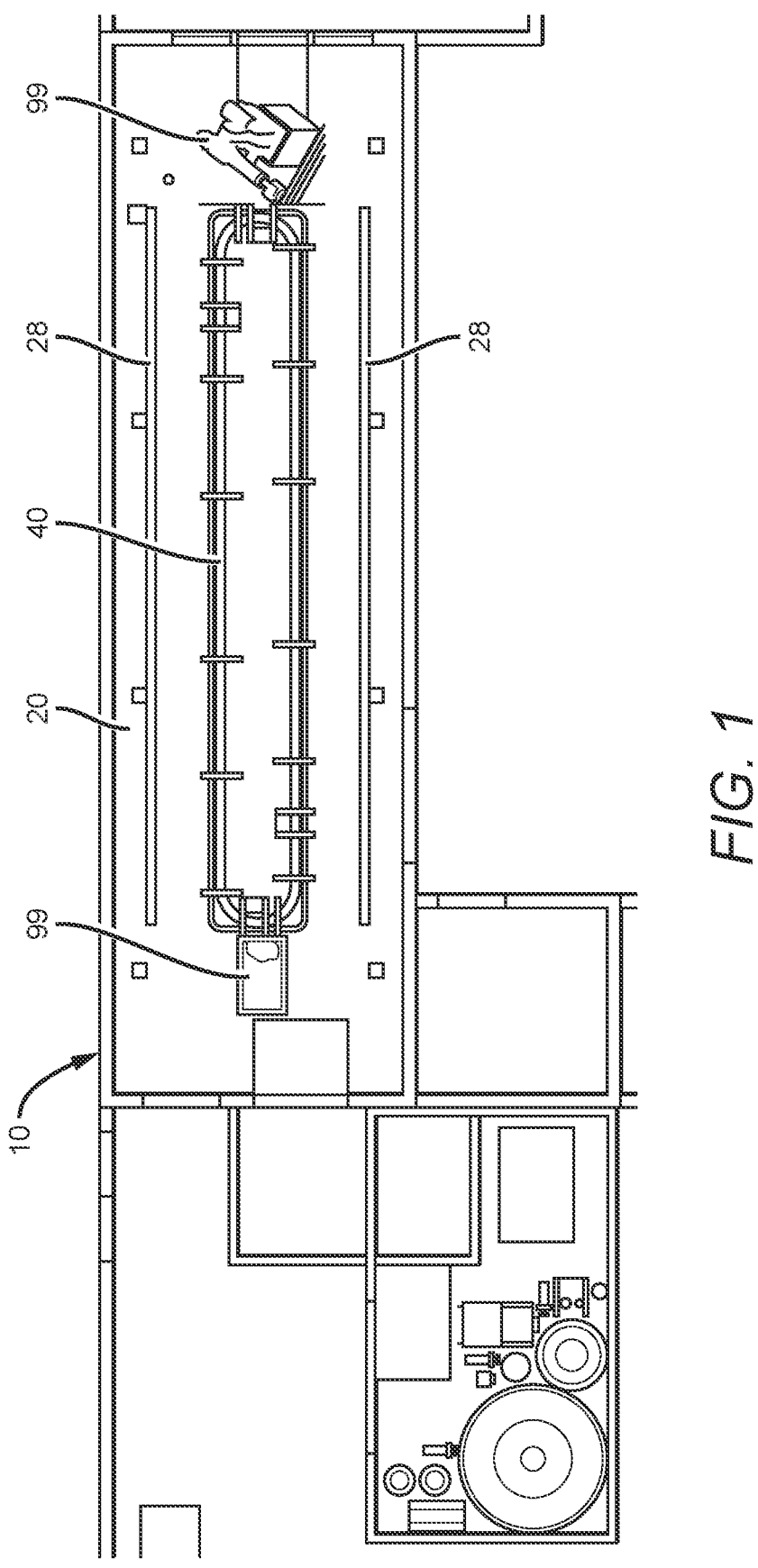
FIG. 1 is a functional diagram illustrating an example controlled environment agriculture system, according to embodiments of the disclosure.

FIG. 1 is a functional block diagram illustrating an example controlled environment agriculture system 10. At a high level, the system 10 may include an environmentally-controlled growing chamber 20 including a plurality of grow towers 50 attached to a tower conveyance system 40. In other embodiments, the grow towers 50 may be replaced by other grow structures such as pots. In the implementation shown, tower conveyance system 40 conveys grow towers 50 around a travel path that includes one or more harvesting stations 99 where robots or humans can harvest crop grown on the grow sites of a grow tower 50. Not shown in this figure are systems for extracting grow towers 50 from chamber 20 or for injecting grow towers 50 into chamber 20. For didactic purposes, one implementation of the system is described in connection with a farm system that employs vertical grow towers. In one implementation, the grow containers may be vertical grow towers including grow sites along one or more faces of each tower, as disclosed in International Application Serial No. PCT/US19/058764, which is incorporated by reference herein for all purposes. The crops or plants species that may be grown may be gravitropic/geotropic and/or phototropic, or some combination thereof. The crops or plant species may vary considerably and include various leaf vegetables, fruiting vegetables, flowering crops, fruits and the like. The controlled environment agriculture system 10 may be configured to grow a single crop type at a time or to grow multiple crop types concurrently. Other implementations are possible. For example, while the systems illustrated in FIGS. 1 and 3 disclose a system that operates as a loop, the invention can be applied to a linear system.

Growth chamber 20 may include environmental control systems, and associated sensors, for regulating at least one environmental condition, such as air temperature, airflow speed, relative air humidity, and ambient carbon dioxide gas content. The control systems may, for example, include such sub-systems as HVAC units, chillers, fans and associated ducting and air handling equipment. The controlled environment agriculture system 10 may include corresponding sensors and programming logic for tracking the grow towers 50 and the plants located therein during various stages of the farm production cycle and/or for controlling one or more conditions of the growth chamber 20. The operation of control system and the length of time towers remain in chamber 20 can vary considerably depending on a variety of factors, such as crop type and other factors. For example, grow towers 50 containing strawberries can remain in chamber 20 for hundreds of days. The control system is capable of automated adjustments to optimize growing conditions within the growth chamber 20 to make continuous improvements to various attributes, such as crop yields, visual appeal and nutrient content. In addition, US Patent Publication Nos. 2018/0014485 and 2018/0014486 describe application of machine learning and other operations to optimize grow conditions in a farming system. In some implementations, environmental condition sensors may be disposed proximal to the towers or at various locations in growth chamber 20. When crops are ready for harvesting, tower conveyance mechanism 40 may convey grow towers 50 to be harvested to harvesting station 99 for harvesting and other processing operations. In other implementations, the grow towers 50 may be transferred out of chamber 20 for harvesting. As discussed in International Application Serial No. PCT/US19/058764 (the entire disclosure of which is incorporated by reference herein for all purposes), a central processing system may include one or more conveyance mechanisms for directing grow towers 50 to stations in the central processing system—e.g., stations for loading plants into, and harvesting crops from, the grow towers 50. In the implementation, shown in FIG. 1, however, harvesting station 99 is located within growth chamber 20. In other embodiments, harvesting station 99 may be located outside growth chamber 20.

Growth chamber 20 may include light emitting sources 28 positioned at various locations between and along the grow path defined by tower conveyance mechanism 40. The light emitting sources can be positioned laterally relative to the grow towers 50. For example, the light emitting sources may be configured to emit light toward the lateral faces of grow towers that include openings from which crops grow. The light emitting sources may be incorporated into a water-cooled, LED lighting system as described in U.S. Publ. No. 2017/0146226A1, the disclosure of which is incorporated by reference herein. Alternatively, the LED lighting system may be air-cooled as described in U.S. Publ. No. 2021/0315169 A1, published 14 Oct. 2021, which is also incorporated by reference herein.) In such embodiments, the LED lights may be arranged in a bar-like structure. The bar-like structure may be placed in a vertical orientation to emit light laterally to substantially the entire length of adjacent grow towers. Multiple light bar structures may be arranged in chamber 20 along grow path. Other lighting systems and configurations may be employed. For example, the light emitting elements may be arranged in a grid-like or matrix structure running along the grow path.

The system 10 may also include an irrigation system configured to supply an aqueous nutrient solution to the crops as they translate through chamber 20. In implementations using grow towers 50, the nutrient supply system may apply aqueous crop nutrient solution to the top of the grow towers. Gravity may cause the solution to travel down the vertically-oriented grow towers 50 and through the length thereof to supply solution to the crop sites disposed along the length of the grow tower 50. The growth environment 20 may also include an airflow source configured to, when a tower is mounted to conveyance mechanism 40, direct airflow in the lateral growth direction of growth and through an under-canopy of the growing plant, so as to disturb the boundary layer of the under-canopy of the growing plant. In other implementations, airflow may come from the top of the canopy or orthogonal to the direction of plant growth.

Figure 2B:
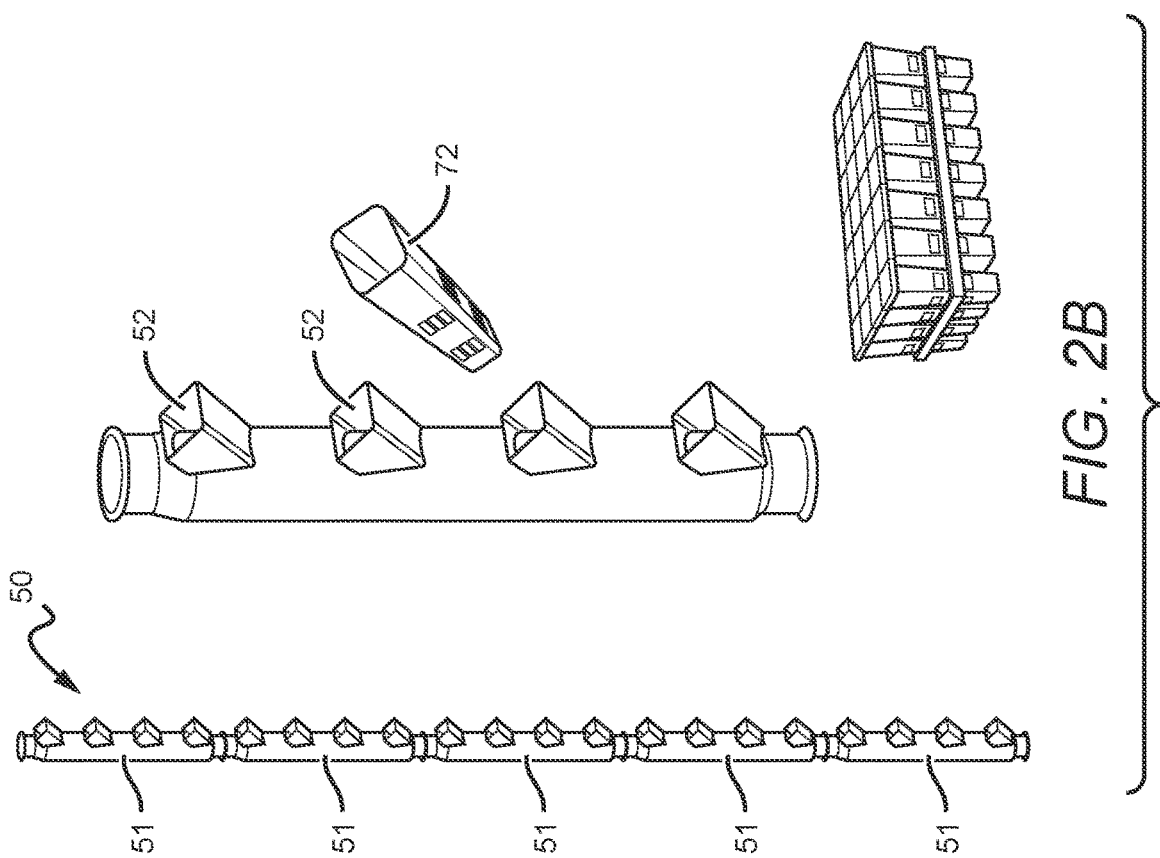
FIG. 2B illustrates an example grow tower.
Figure 2A:
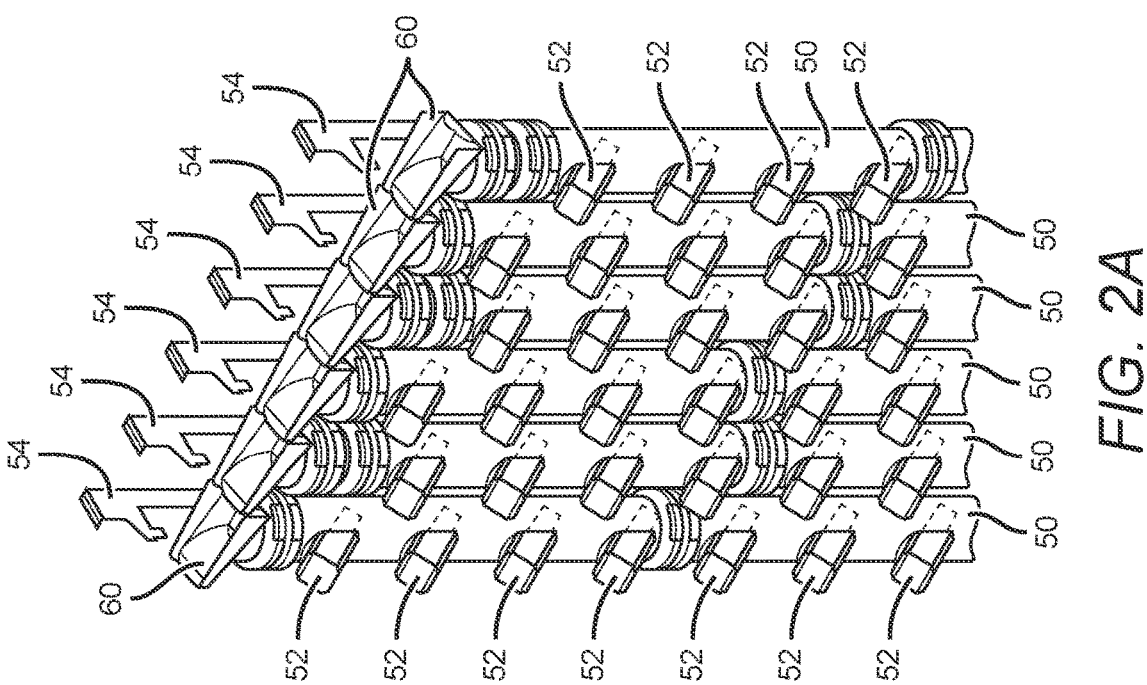
FIG. 2A is a partial perspective view of grow towers including funnels arranged in an overlapping configuration.

FIG. 2A illustrates a set of grow towers 50 according to one implementation of the disclosure. Each grow tower 50 is configured to contain plant growth media that supports a root structure of at least one crop plant growing therein. Each grow tower 50 is also configured to releasably attach to a grow conveyance mechanism 40 in a vertical orientation and move along a travel path within growth environment 20. In the implementation shown, a grow tower 50 comprises a plurality of grow sites 52 extending along the length thereof and a tower funnel 60 attached to the top of the grow tower 50. As FIG. 2B illustrates, in one implementation, each grow site 52 may be configured to accept a plug container 72 that contains a root plug of a crop to be grown. The root plug may be held within the inner cavity defined by grow tower 50 such that it is in the path of aqueous nutrient solution trickling down from funnel 60 to thereby irrigate the root plug. FIG. 2B also illustrates how a grow tower 50 can be assembled from a plurality of individual tower sections 51.

Figure 3:
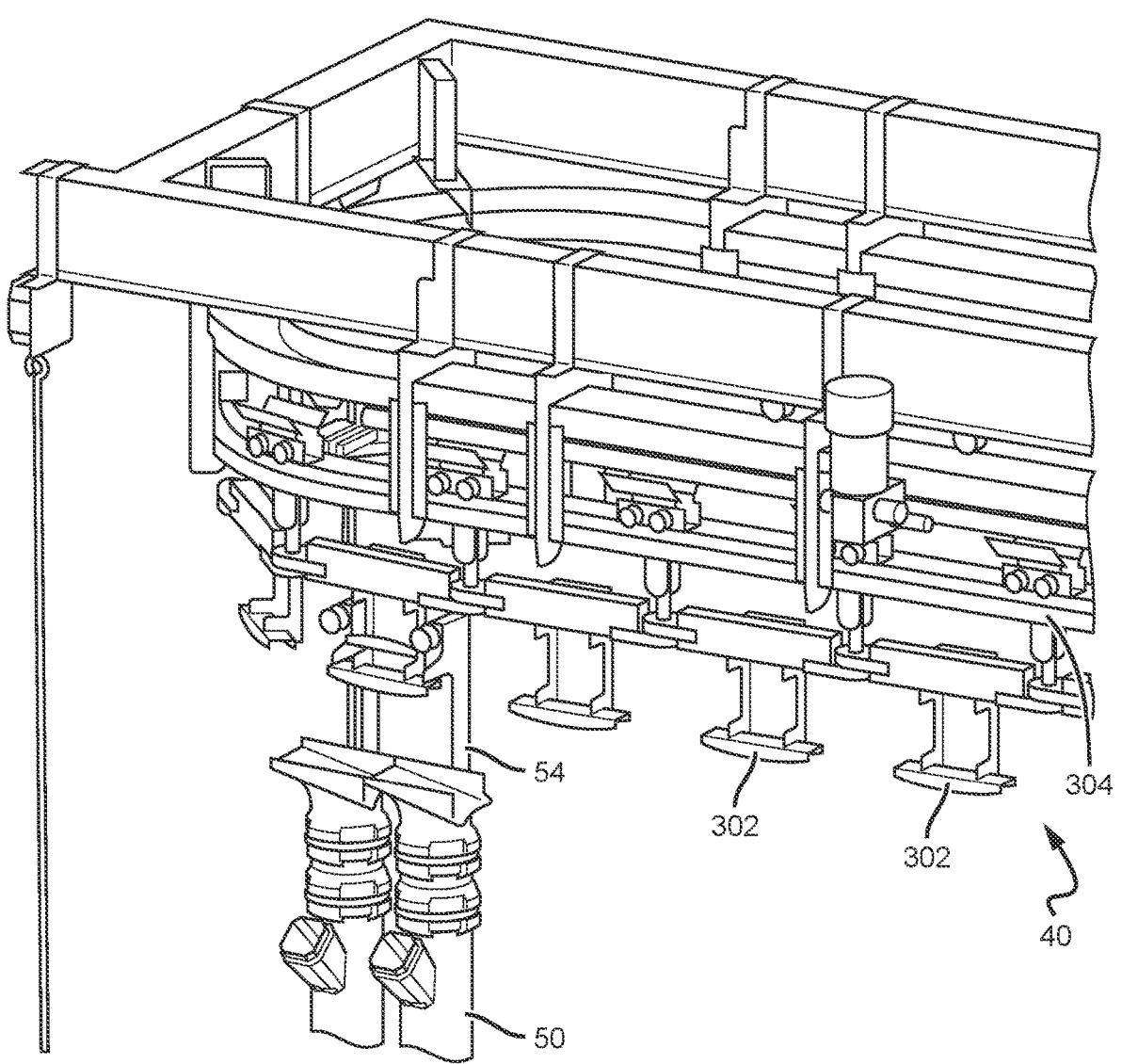
FIG. 3 is a partial perspective view of a grow tower conveyance system.

As FIG. 3 illustrates, a tower hook 54 attaches the grow tower 50 to the conveyance mechanism 40. In one implementation, conveyance mechanism 40 may comprise a power-and-free conveyor to move grow towers 50 along a travel path within environment 20; however, other mechanisms, such as that illustrated in FIG. 3 can also be used to convey grow towers 50. As FIG. 3 further illustrates, the conveyance mechanism 40 may include a plurality of trolleys 302 disposed on a track 304 that defines the travel path for the grow towers 50 within chamber 20. In the implementation shown, each trolley 302 can accommodate two grow towers 50. In other implementations, each trolley 302 can accommodate a lesser or greater number of grow towers 50. The irrigation system may include one or more irrigation lines with apertures or nozzles that supply nutrient solution at various locations along the irrigation lines. The irrigation lines may be disposed along the travel path defined by track 304 and located over the funnels 60 of the grow towers 50.

Figure 4:
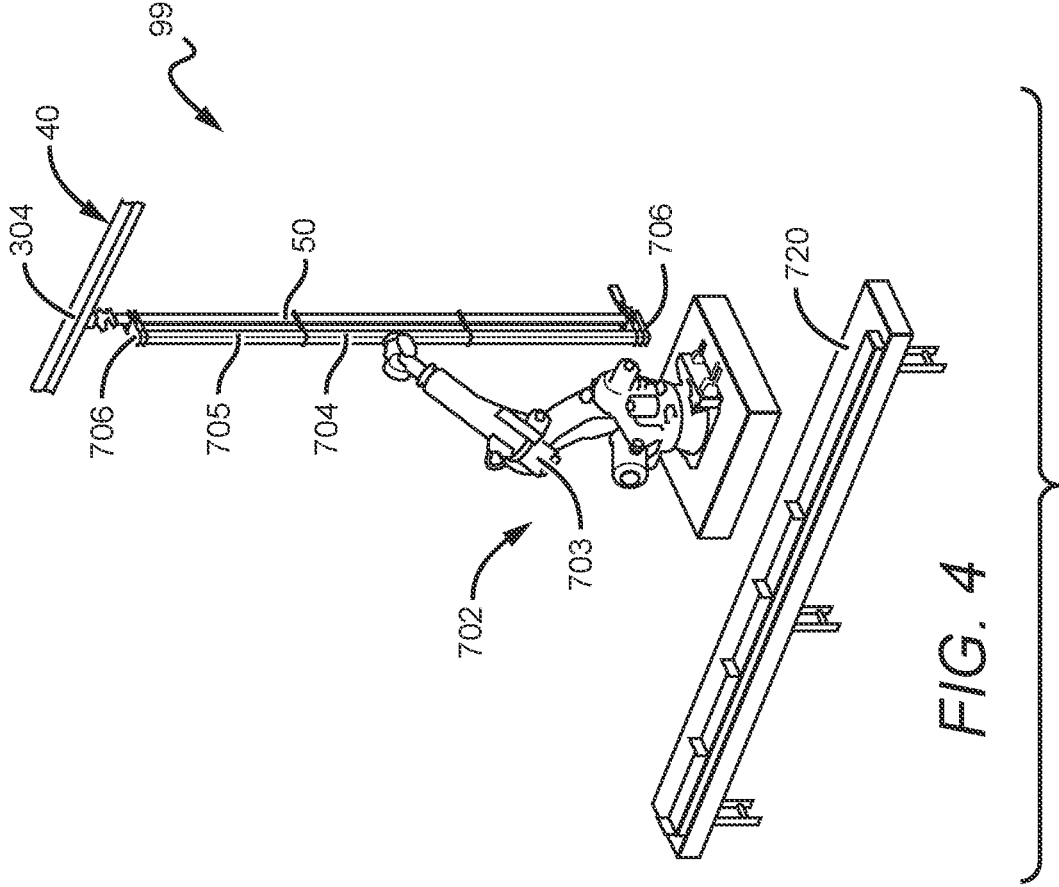
FIG. 4 is a perspective view of an example shake harvesting station, according to embodiments of the disclosure.

FIG. 4 illustrates a harvester station 99 according to one possible implementation of the disclosure. In the implementation shown, harvester station 99 comprises automated station 702 including a robotic arm 703 and an end effector 704. End effector 704 is configured to releasably grasp a grow tower 50 and to allow robotic arm to remove it from track 304. Robotic arm 703 may be a six-degrees of freedom robotic arm, such as a FANUC robot. End effector 704 may comprise gripping assemblies 706 releasably grasping grow towers 50 at opposing ends. U.S. application Ser. No. 17/607,882 (incorporated by reference herein for all purposes) discloses the pneumatics and other assemblies for operating the gripping assemblies 706. The gripper assemblies disclosed in this application can be adapted to the contours of the grow tower 50 to releasably grasp them for the operations described herein.

In one implementation, the robotic arm 703 moves the grow tower 50 from a vertical orientation to a horizontal orientation over harvest trough 720. When the grow tower 50 is positioned over trough 720, the robotic station 702 may vibrate the grow tower 50 to dislodge one or more crops from plant(s) disposed in grow sites 52 of the tower 50. In the implementation shown, the dislodged crops (such as tomatoes) are caught by trough 720 and can be conveyed for post-harvesting operations, such as cleaning, inspection, packaging and the like. After the harvesting operation, robotic station 702 may return the tower 50 to track 304 and repeat the process on the next tower in the conveyance system 40.

Robotic station 702 may employ a variety of mechanisms to vibrate the grow tower 50. For example, the robotic arm 703 may be controlled to vibrate the grow tower 50. In other implementations, the end effector 704 may include a reciprocating mechanism that vibrates the end effector 704 itself with the attached grow tower 50. The reciprocating mechanism may be mounted between the end of robotic arm 703 and the long arm 705. In one implementation, the reciprocating mechanism displaces the tower 50 longitudinally along the direction of arm 705. In other implementations, the reciprocating motion could be perpendicular to arm 705. In another implementation, the gripping assemblies 706 may be driven by a vibrating actuator, such as pneumatic or electric vibrating motors. For example, each gripping assembly 706 may be attached to a plate that includes a vibrating actuator. The plate may be isolated from a fixed frame with rubber mounts. The vibrating actuator may comprise any mechanism that imparts reciprocating motion, such as a linkage, crankshaft, slider crank, scotch yoke and the like. In another implementation, the harvesting mechanism may contact the crop growing in the towers 50 as opposed to engaging and vibrating the towers. For example, the robotic station 702 may locate the tower over trough 720. A separate harvesting mechanism, such as actuated plates or rods disposed at various locations along the tower 50, actuate the crop side-to-side causing the crop to fall into trough 720. In other implementations, forced air could be used to disturb the plant crop and cause the crop to fall from plants in towers 50 or other structures.

The amplitude and direction of the fruit removal force generated by the robotic station 702 will depend on, and can be calibrated to, the crop type. The shake harvesting station 702 disclosed herein has especial application to fruiting crops, such as tomatoes. In some implementations, dwarf or micro dwarf plant varieties suitable for growing in grow towers 50 may be employed. In some implementations, the plant variety can be bred to a target fruit removal force in addition to other traits.

Harvest trough 720 may vary considerably depending on crop type and engineering goals and constraints. For example, harvest trough may simply be a belt conveyor system onto which crops fall after shake harvesting. The belt conveyor may then engage to convey the crops away for post-harvest processing. In other implementations, harvest trough 720 may comprise a trough that includes a water pool into which the crops are dropped in order to reduce potential damage from the fall. Given the ability of the robotic station 702 to place grow tower 50 relatively close to the trough 720, it is envisioned that water troughs would be used for especially fragile fruited crops or in instances where potential bruising is to be minimized.

Other implementations are possible. For example, shake harvesting station 702 may be configured to concurrently grasp multiple grow towers 50 and vibrate them at the same time. In addition, shake harvesting station 702 may be configured to vibrate or shake grow towers 50 while oriented in a vertical orientation. Still further, robotic station 702 may be configured to operate with grow structures that are normally oriented horizontally during a grow period, such as gutters, rafts and other planar structures. Furthermore, robotic station 702 may be adapted to operate in connection with grow structures that include fewer grow sites, such as a pot or other container that includes one grow site. Still further, the robotic station 702 may be integrated into an autonomous robotic system that transits the harvesting station to the grow structures and to the harvesting station.

In another implementation, shake harvesting functions may be incorporated into tower conveyance. For example, the conveyance mechanism may be configured to drive the hooks 54 of tower 50 over a series of ramps, each of which creates an impact when a tower 50 slides down the ramp and stops thereby shaking crop free. In another implementation, a harvesting station may be configured to grasp hook 54 and reciprocate the tower 50 without moving it to a horizontal orientation. The reciprocating motion may be longitudinal, latitudinal, and/or rotational about the central (longitudinal) axis of tower 50.

Additional operational and configuration details of an example farm system environment in which implementations can be used are set forth in International Application Serial Nos. PCT/US19/023201 and PCT/US19/058770, which are incorporated by reference herein for all purposes. In addition, while certain implementations are described as operating in connection with vertical grow towers, other implementations employ other grow structures, such as pots, horizontal trays stacked in vertical configurations, and the like.

Production System with Improved Light Exposure

Fruiting vegetables such as tomatoes have long been an opex intensive crop, with the majority of costs concentrated in pruning, training, and harvesting. By changing the morphology and production paradigm, crop yield per square meter can be increased by an order of magnitude, while eliminating the labor costs of tomatoes, and reducing the risk profile of a typical tomato crop. The final product can be higher quality than tomatoes at market today.

Embodiments of the disclosure may employ four properties of tomatoes or other fruiting plants (referred to herein as "fruiting vegetables" or "fruits"):

1. High canopy density
2. High light over the entire canopy profile
3. Plant concentration-more plants per square meter
4. Fast, short lifecycles focused on bursts of yield 1. High Canopy Density According to embodiments of the disclosure, some fruiting plants may have a high canopy density, e.g., in the range of 10-40 plants per square meter. For example, micro-dwarf tomatoes, dwarfed down to short, gnarled canopy sizes enable many plants to be packed into small spaces. The size of the canopy density (e.g., in a range of 10-40 plants per square meter) ensure that with proper spacing there is a large photosynthetic potential in a small, concentrated space, and that applied light will experience close to 100% interception. As examples, the spacing may be 10-60 cm inter-tower spacing×20 cm inter-plant spacing within towers for plants in plant grow sites such as 52 in FIG. 2B, and 25 cm×25 cm spacing between plant pot grow sites (e.g., 24 cm×24 cm for 10 plants/m²). The density of the canopy also allows fast and efficient movement of photosynthates, water, and nutrients throughout the plant canopy, ensuring that whole-plant response to light is fast and efficient.

These plants also eliminate the need for pruning and training because of their size. Because they are short and dense, they require no pruning or training. This eliminates the bulk of the labor cost of a greenhouse. These plants can be determinate or indeterminate in nature, growing for long or short periods of time, but typically will be grown for shorter periods of time, to allow for more aggressive production, and elimination of concern around disease establishment or nutrient disorders developing.

2. High Light Application Over all or Almost all of Canopy

The density of canopy, thickness of leaves, and chlorophyll content of tiny plants such as micro dwarf tomatoes enables extremely high light application with lower photoinhibition/photorespiration. By directing light above and below the canopy, high light levels (e.g., 800 PPFD with a long photoperiod (e.g., 20 hours)) can be achieved throughout the small, dense canopy, driving maximum photosynthetic rates across every leaf and plant surface. This ability to apply high light in such a concentrated manner enables the plant to engage in extremely high photosynthate production within a tiny volume. Where 36-72 inch long vines have traditionally produced fruit at concentrated levels lower on the vine, the upper parts of the vine are leggy and carbon-rich, and highly distributed. All of that carbon is wasted on non-salable biomass instead of being concentrated in the fruit. High light application in the greenhouse is less dynamic, and must be spread out over the top of the leggy canopy. Much of the carbon fixed by that light will go to growing tips, rather than growing fruit. Embodiments of the disclosure fundamentally challenge this model by concentrating carbohydrates in fruit, and allowing the concentrated and condensed production of that fruit at yields an order of magnitude higher than the greenhouse.

This canopy density also allows the handling of the entire plant. In tomato greenhouses, the plants cannot be moved, so the farm invests heavily in equipment that moves to the plant, which is very inefficient. This drives high farm opex costs. In embodiments of the disclosure, the small plants or plant communities (towers, gutters) can be moved en masse, conveyed to harvest areas, and shaken over water bath conveyors, nets, or other means of catching and conveying the fruit as opposed to hand harvesting-eliminating the harvesting cost of greenhouse tomatoes. This drives an automation approach that is labor light, and more plant to process rather than the much more inefficient process to plant approach forced in greenhouse production. This harvesting technique uses abscission layers either bred or induced using plant hormones to enable the fruit to easily break free of the plant.

3. Plant Concentration

Plant concentration due to small canopy sizes and the advent of indexing systems allows for these plants to be grown at multiple orders of magnitude higher densities than greenhouse tomatoes. A density of 14-20 plants per square meter of growing plane, with up to 8 meters of growing plane per square meter of floorspace means that there can be as many as 160 plants per square meter compared to greenhouse production. At 1-1.8 kg/plant, and 4 cycles per year, the upper limits of facility production land in the 1,150 kg/sq. m. range for brix 10+ cherry tomatoes. Compared to industry standard yield of 60-70 kg/sq. m. for brix 4-6 cherry tomatoes, the productivity of this system is greater than any tomato production system in existence.

4. Short Production Cycles

All of this is done in short production cycles (lifecycles) of 40-90 days. This range is between ⅟₁₀th to ⅓ the typical production cycle for tomatoes. Tomatoes are a high risk crop primarily because they are grown for long periods of time, and the more time there is for pathogen problems or nutrient disorders to develop, the higher the likelihood that they will. These risks have large impacts on yield. If they arise in the first three months, before the crop begins to bear, then the entire crop can be forfeit, along with months of investment. By shortening the cycle, one can reduce risk and induce the plants to focus their energy and focus into yield, before trashing them and starting over. The concept of a "disposable" tomato crop is relatively novel, and shifts the risk profile of the farm meaningfully.

Embodiments of the disclosure are superior to a greenhouse on many cost and risk metrics, and can be scaled to plum, roma, and slicer type tomatoes. Lower cost implies that this system could replace field production to a large extent.

Figure 5:
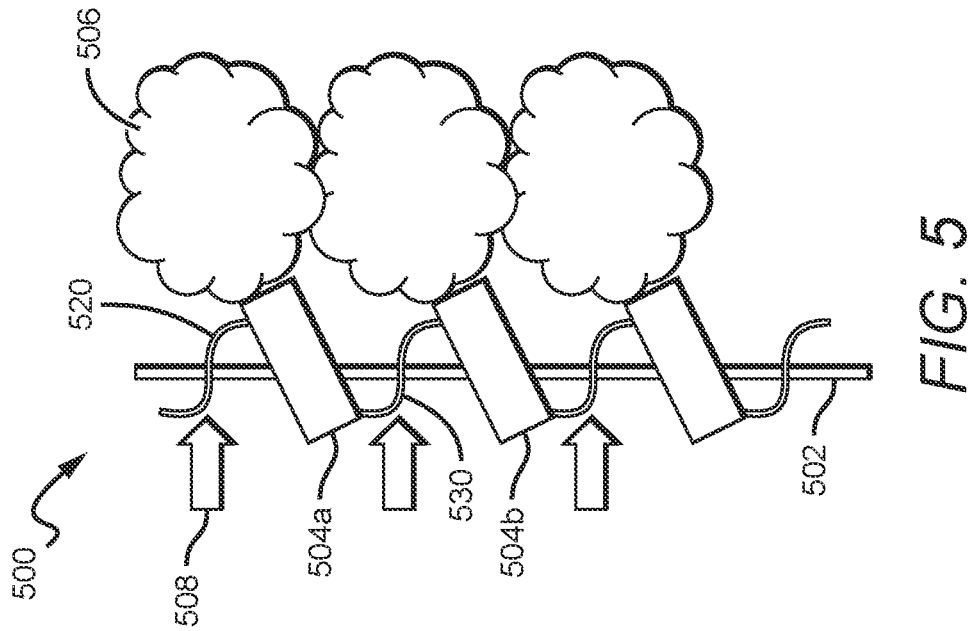
FIG. 5 illustrates a tower according to embodiments of the disclosure.

FIG. 5 illustrates a tower 500 according to embodiments of the disclosure. The tower 500 may include a spine 502 and tiltable grow sites 504 (e.g., pots). Each grow site may hold a plant 506 such as a micro dwarf tomato. Micro dwarf tomatoes used in embodiments of the disclosure may range in size from 17 cm (width)×17 cm (width)×14 cm (height) to 53 cm×53 cm×45 cm. Thus, grow sites 504 may typically be spaced apart from each other by approximately 20-55 cm. The grow sites 504 are positioned along the longitudinal axis of the spine. The spine may comprise a rigid structure, such as PVC tubing, or a flexible structure, such as a cord, a cable, a rope, or the like.

In this example, light 508 (e.g., from an LED light bar) is shown as shining laterally on to the canopy (e.g., with much light directed to the under-canopy) of the plants 506 during a growth phase of the plants 506. In general, the light 508 may be directed at an acute angle with respect to the horizontal dimension. Light may arrive from other angles (e.g., from the right, more toward the canopy top), as well. The cross-sectional area of the spine 502 with respect to the canopy of the plant 506 is relatively small, to reduce the shadow of the spine 502 on the canopy. According to embodiments of the disclosure, a ratio of a width (e.g., diameter) of the spine to a width (e.g., pot diameter) of the grow sites is less than 1.0. According to embodiments of the disclosure, the "width" of the spine and of each grow site may refer to the largest width over at least 80 percent of the length of the spine or the grow site, respectively. As examples, the spine may have a 1-3 inch diameter, and the pots a diameter in a 3-4 inch range.

Figure 6:
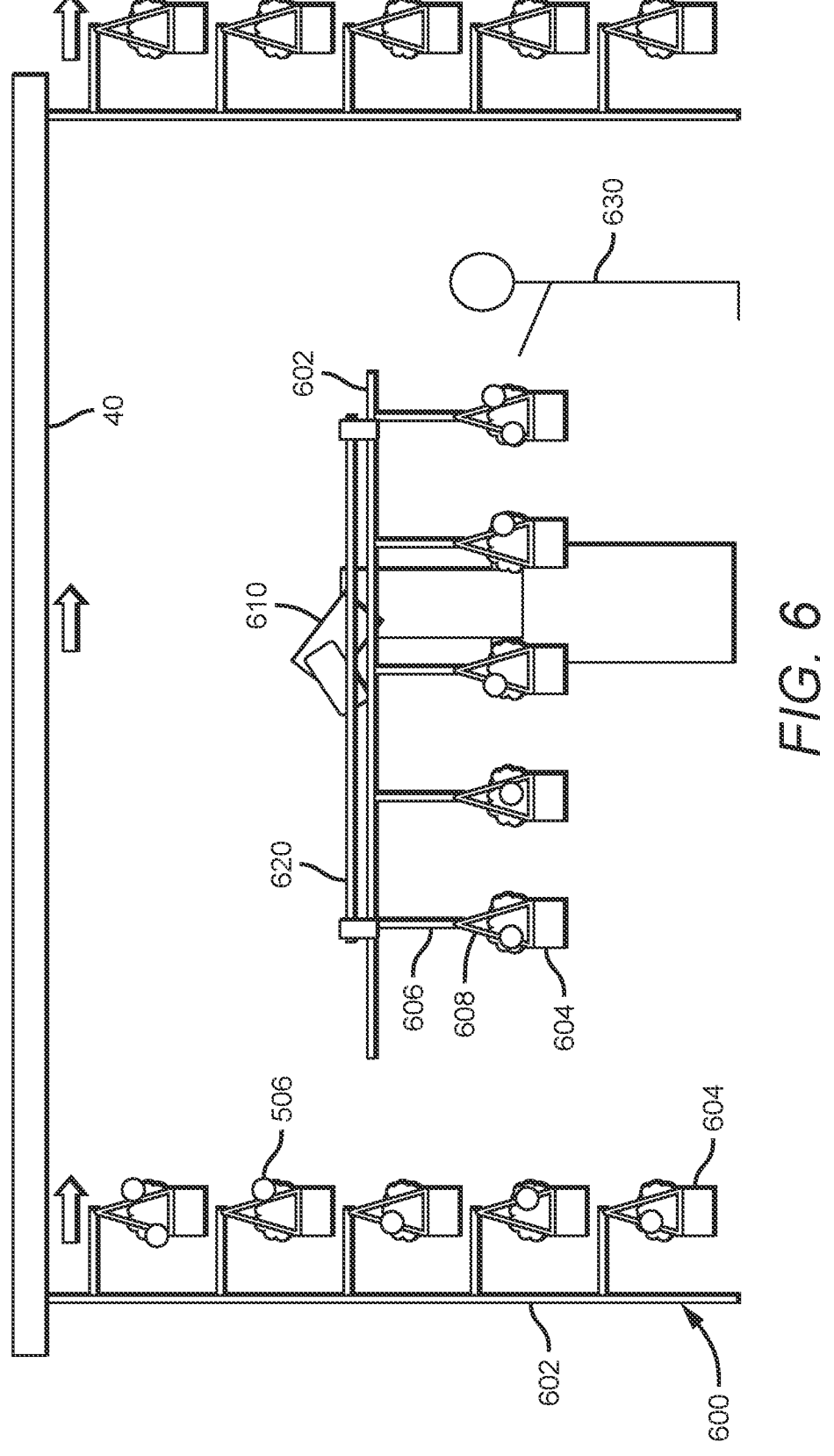
FIG. 6 illustrates a conveyance mechanism with towers positioned during growth and harvesting stages, according to embodiments of the disclosure.

The grow sites 504 may be coupled to spine 502 by a fixed or rotatable coupling (e.g., a swivel, a loose nut and bolt coupling, or a standoff 602 and cord 604 arrangement as in FIG. 6) that enables the grow sites 504 to be tilted at an angle with respect to the spine 502. According to embodiments of the disclosure, each grow site 504 is oriented at an angle between 30-90 degrees with respect to the vertical dimension during the growth stage. This exposes the under-canopy to the light 508.

FIG. 6 illustrates a grow line/conveyance mechanism 40 with towers 600 positioned during growth and harvesting stages. In the illustrated embodiment, the grow sites 604 are coupled to the spine 602 via a coupling comprising a standoff 606 and a grow site holder 608. The standoff 606 is mounted to the spine 602, and is attached to a grow site holder 608 that can swing so as to maintain orientation of the grow sites 604 in a vertical position (or other (e.g., tilted) position depending upon weighting of the grow sites 604) as the tower 600 is rotated into a horizontal position (or substantially horizontal position, e.g., within 30 degrees of horizontal) for harvesting. The grow site holder 608 may comprise a flexible material such as a cord, cable, rope, or the like. In other examples, this embodiment may employ towers such as tower 500 that are conveyed along grow line 40 with the couplings between grow sites 504 and spine 502 as described above with respect to FIG. 5.

According to embodiments of the disclosure with reference to FIG. 6, the spine 602 is vertically (or substantially vertically) positioned during a growth phase of the plants 506, and horizontally (or substantially horizontally) positioned during a harvesting phase of the plants 506. Similar to the description above with respect to robot 704, during a harvesting phase a robot 610 having an end effector 620 may grasp vertically positioned tower 600, remove it from conveyance/grow line 40, and rotate it into a horizontal position. In this example, the coupling (e.g., standoff 606/holder 608) between grow sites 604 and spine 602 enables the grow sites 604 to swing freely or at least rotate to maintain orientation of the grow sites 604 in a vertical position as the tower 600 is rotated into a horizontal position. While in the horizontal, laydown position, a human or robot picker 630 may remove the fruit from the plants 506.

FIGS. 5 and 7-10 illustrate different approaches to irrigating towers.

In FIG. 5, irrigation line 520 enters at a top portion of the pot 504a and irrigation line 530 exits from a bottom portion of the pot 504a. According to embodiments of the disclosure, irrigation line 520 enters the interior of pot 504a through a hole or similar opening to supply water or other nutrient fluid that is distributed into the soil of plant 506. According to embodiments of the disclosure, irrigation line 530 exits the interior of pot 504a through a hole or similar opening. Due to gravity, unabsorbed fluid exits via line 530, which acts as a supply line to one or more pots 504b below.

According to embodiments of the disclosure, the bottom portion of pot 504a may include a shallow funnel or other part (not shown) that is connected to line 530 to collect fluid and direct it to line 530.

According to embodiments of the disclosure, instead of separate lines, lines 520 and 530 may be one continuous line with perforations along a length of the line that passes through pots 504.

Figures 7, 8, 9, 10:
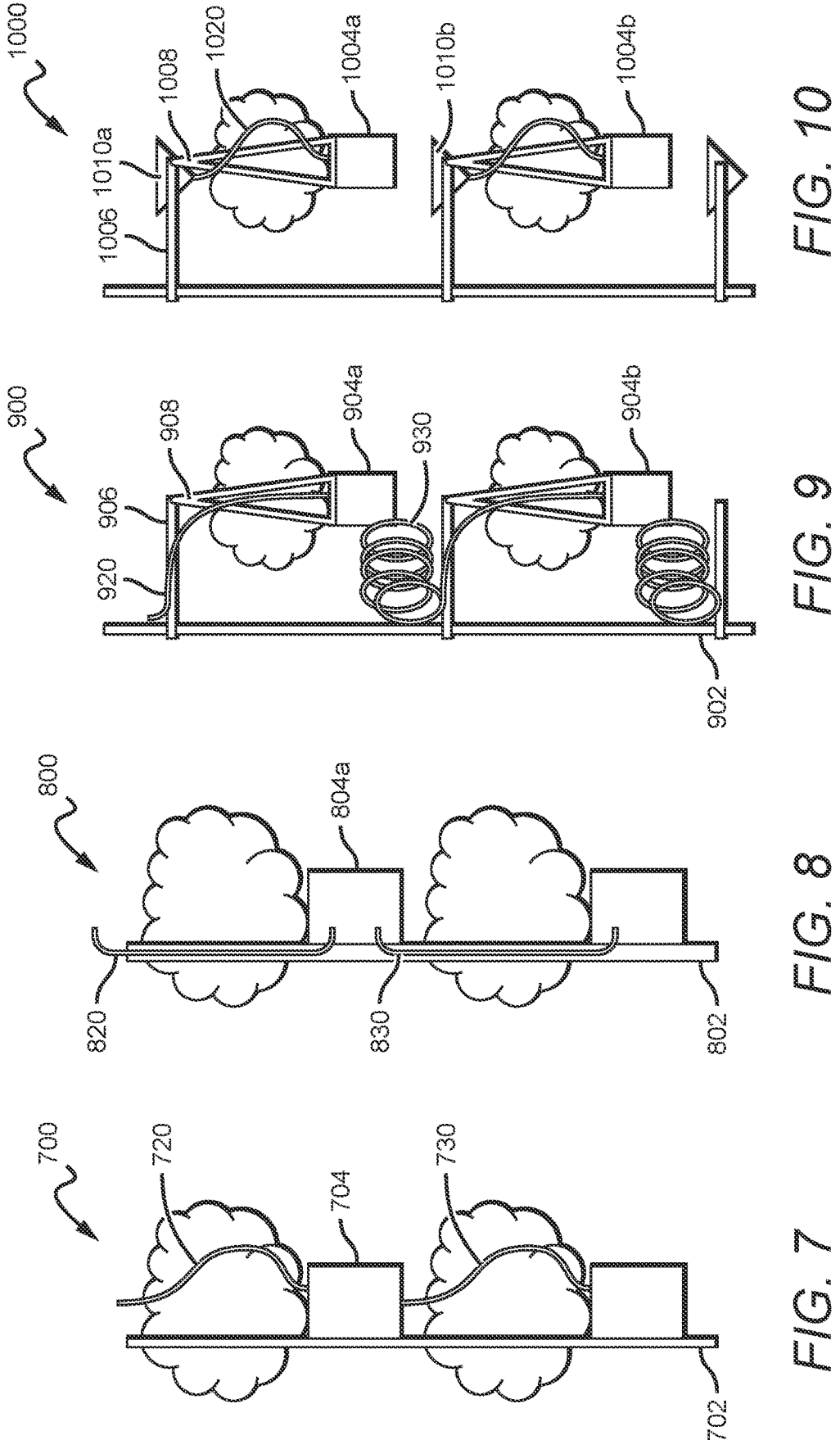
FIGS. 7 and 8 illustrate towers with different irrigation line arrangements, according to embodiments of the disclosure.
FIG. 9 illustrates a tower with an irrigation line arrangement that enables pots to maintain their orientation between growth and harvesting stages, according to embodiments of the disclosure.
FIG. 10 illustrates a tower that employs funnels for irrigation, according to embodiments of the disclosure.

FIG. 7 illustrates a tower 700 that is similar to tower 500, except pots 704 are not tilted with respect to a spine 702. The irrigation lines 720 and 730 may take the same form as lines 520 and 530 described above.

FIG. 8 illustrates a tower 800 that is similar to tower 700. The irrigation lines 820 and 830 may take the same form (e.g., separate or continuous) as lines 520 and 530 described above. However, spine 802 is hollow so that a portion of irrigation lines 820 and 830 may run through the spine 802 before respectively supplying fluid to a top portion of pot 804a and draining fluid from a bottom portion of pot 804a.

FIGS. 9 and 10 include standoff 906, 1006/pot holder 908, 1008 arrangements like that of tower 600. This enables pots 904a, 1004a to swing freely to maintain their vertical orientation when the spine is rotated to a horizontal position for harvesting.

In FIG. 9, irrigation line 930 exiting the bottom portion of a pot 904a is coiled and made long enough so that pot 904a can swing a full 90 degrees during lay down.

According to embodiments of the disclosure, tower 1000 of FIG. 10 employs a funnel 1010*a* coupled to standoff 1006. The funnel 1010*a* collects fluid supplied from above. The outlet of the funnel 1010*a* drains to an irrigation line 1020 that feeds fluid to a top portion of pot 1004*a*. Pot 1004*a* include drainage holes in the bottom so that unabsorbed fluid can drain into a lower, adjacent funnel 1010*b* to irrigate lower pot 1004*b*.

Those skilled in the art will recognize that, in some embodiments, some of the operations described herein may be performed by human implementation, or through a combination of automated and manual means. When an operation is not fully automated, appropriate components of embodiments of the disclosure may, for example, receive the results of human performance of the operations rather than generate results through its own operational capabilities.

Although the disclosure may not expressly disclose that some embodiments or features described herein may be combined with other embodiments or features described herein, this disclosure should be read to describe any such combinations that would be practicable by one of ordinary skill in the art. Unless otherwise indicated herein, the term "include" shall mean "include, without limitation," and the term "or" shall mean non-exclusive "or" in the manner of "and/or."

All references cited herein, including, without limitation, articles, publications, patents, patent publications, and patent applications, are incorporated by reference in their entireties for all purposes, except that any portion of any such reference is not incorporated by reference herein to the extent it: (1) is inconsistent with embodiments of the disclosure expressly described herein; (2) limits the scope of any embodiments described herein; or (3) limits the scope of any terms of any claims recited herein. Mention of any reference, article, publication, patent, patent publication, or patent application cited herein is not, and should not be taken as an acknowledgment or any form of suggestion that it constitutes valid prior art or forms part of the common general knowledge in any country in the world, or that it discloses essential matter.

In the claims below, a claim n reciting "any one of the preceding claims starting with claim x," shall refer to any one of the claims starting with claim x and ending with the immediately preceding claim (claim n-1). For example, claim 35 reciting "The system of any one of the preceding claims starting with claim 28" refers to the system of any one of claims 28-34.

What is claimed is:

1. A harvesting system comprising a plurality of structures and a superstructure from which the structures are suspended and conveyed along a grow line to a harvesting site, each plant support structure comprising:
 a. a spine; and
 b. a plurality of grow sites coupled to the spine, wherein i. each grow site in the plurality of grow sites is disposed above another grow site of the plurality of grow sites, and
 ii. each grow site is coupled by a coupling to the spine so that the grow site is free to move in at least one dimension to maintain its orientation while a major axis of the spine moves from a non-horizontal dimension toward a horizontal dimension.

2. The system of claim 1, wherein a width of the spine is in a range of 1-3 inches and the width of the grow sites is in a range of 3-4 inches.

3. The system of claim 1, wherein each grow site is coupled by the coupling to the spine so that the grow site is free to move in at least one dimension to maintain its orientation while a major axis of the spine moves from an angle between 30-90 degrees with respect to a vertical dimension toward a horizontal dimension.

4. The system of claim 1, wherein each grow site is coupled by the coupling to the spine so that the grow site is free to move in at least one dimension to maintain its orientation while a major axis of the spine moves from an angle between 30-90 degrees with respect to a vertical dimension during a growth stage toward a horizontal dimension during a harvesting stage.

5. The system of claim 1, wherein a ratio of a width of the spine to a width of each grow site is less than 1.0.

6. The system of claim 1, each of the plurality of grow sites comprising a first irrigation line entering a top portion of the grow site and a second irrigation line exiting a bottom portion of the grow site.

7. The system of claim 1, wherein the spine comprises a hollow structure that has an inlet for collecting fluid from an upper grow site of the plurality of grow sites and an outlet for providing fluid to a lower grow site of the plurality of grow sites.

8. The system of claim 7, wherein the hollow structure comprises a tube.

9. The system of claim 7, wherein the inlet is connected to the upper grow site and the outlet is connected to the lower grow site.

10. The system of claim 1, further comprising, for each of the plurality of grow sites, a funnel for directing fluid toward a top portion of the grow site.

11. The system of claim 1, wherein the coupling comprises a cable, cord, or rope.

12. The system of claim 1, wherein a ratio of a width of the spine to the width of the grow sites is less than 0.25.

13. The system of claim 1, wherein structure is a grow tower.

14. The system of claim 1, wherein each grow site comprises a pot.

15. The system of claim 1, wherein the spine comprises a rigid structure or a flexible structure.

16. The system of claim 1, wherein the harvesting system resides in a controlled-environment agriculture system.

* * * * *